Oct. 14, 1958

B. P. WASHBURNE 2,856,599

PULSED MAGNETRON SYSTEM

Filed April 22, 1948

Inventor
BRENTON P. WASHBURNE
By H. S. Mackey
Attorney

United States Patent Office 2,856,599
Patented Oct. 14, 1958

2,856,599

PULSED MAGNETRON SYSTEM

Brenton P. Washburne, Pleasantville, N. Y., assignor to General Precision Laboratory Incorporated, a corporation of New York Application April 22, 1948, Serial No. 22,549

12 Claims. (Cl. 343—8)

This invention relates to a pulsed magnetron system wherein the phase of the oscillations of successive transmitted pulse signals is maintained substantially constant.

Various systems have been proposed for utilizing the phenomenon known as Doppler shift for determining the relative speed of two objects. In general this phenomenon is utilized by transmitting a signal wave from one object, reflecting it from the other and comparing the frequency of the reflected signal with that of the transmitted signal. The difference in frequency of these two signals, or the Doppler shift in frequency, is then a measure of the relative speed of the two objects.

Such systems are extremely useful, for example, in providing a means to readily determine the true speed of an airplane or ship since the speed of such a vehicle with respect to the medium in which it moves is an exceedingly inaccurate indication of its true speed as respects the surface of the earth. To determine true speed in such cases a signal is transmitted from the vehicle towards the earth's surface and the reflected signal received on the vehicle, the difference in frequency between the transmitted and reflected signal being measured by suitable means to indicate directly without computation the true speed of the vehicle regardless of any movement of the medium through which the vehicle is traveling.

Such a system in which the phenomenon of Doppler shift is used to determine true speed and true direction of travel is disclosed in the application of Tull and Gillette, Serial No. 749,184, filed May 20, 1947, entitled "Navigation System" and assigned to the same assignee.

In such systems it is advantageous to transmit the signal to be reflected in the form of high frequency pulses because of the ease in isolating transmitted and reflected signals while using a single antenna for both transmission and reception.

In systems of this type the intelligence is transmitted in the form of high frequency pulse signals which occur at discrete intervals of time with periods of no signal between successive oscillatory pulses. When, therefore, a reflected signal is returned, no signal is available with which to compare the frequency of the returned signal in order that the Doppler shift in frequency and thus speed and the like may be determined. In order that such a comparison signal may be available it is necessary to locally generate continuous oscillations which are either of the same frequency as the oscillations of the transmitted pulses or some intermediate frequency thereof. By this means there is available at all times a signal with which the frequency of the reflected signal may be compared regardless of the time of its reception so that the change in frequency undergone by the signal in being transmitted and reflected, that is to say the Doppler shift, may be determined.

Merely to provide a comparison signal of the same or an intermediate frequency of the oscillations of the transmitted pulse signals is not enough to insure that useful information may be derived from transmission, reflection and subsequent reception. In addition to having the same relative frequency, the locally generated continuous signals must have the same relative phase as the oscillations of the transmitted pulses.

Generators of radio frequency pulse signals, as for example, magnetrons, as they have been heretofore operated, are random in phase. That is, the oscillations of any particular pulse may start at any point in their cycle. If then the generator of radio frequency pulse signals were permitted to operate without control the oscillations of successive pulse signals generated thereby would have no definite phase relation either with respect to each other or to the locally generated oscillations which are continuously of the same frequency and phase.

It is a purpose of the present invention therefore, to provide a system in which the phase of the oscillations of the pulses generated by a magnetron or the like may be controlled by a source of oscillations of unvarying phase relation so that there is likewise an unvarying phase relation between the oscillations of the transmitted pulse signals and the oscillations of the locally generated signals used for comparison purposes.

Additionally, it is a purpose of the present invention to provide a system such that while the same antenna is used for both transmission and reception, signals generated by the reference oscillator used to phase the magnetron or other generator of radio frequency pulse signals are transmitted to the magnetron but are prevented from being radiated by the antenna and also essentially all of the energy generated by the magnetron is radiated by the antenna and the remainder of the system is effectively isolated therefrom.

To accomplish this purpose a wave guide loop is provided having the radio frequency pulse generator and antenna connected to one side and the reference oscillator connected to the other side. The loop and points of connection are so proportioned and TR tubes are connected at such positions therein that when caused to fire by the relatively high power of a transmitted pulse signal essentially all of the generated pulse power is transmitted to the antenna and the reference oscillator is effectively isolated from the transmitted pulse signal. At other times, however, between generation and transmission of pulses the TR tubes do not fire and the proportioning of the loop is such that the energy generated by the reference oscillator is fed to the pulse generator to act as a phasing means but is prevented from being radiated by the antenna system.

The exact nature of the invention will be more clearly understood from the following detailed description when considered in connection with the accompanying drawings, in which.

Figure 1:
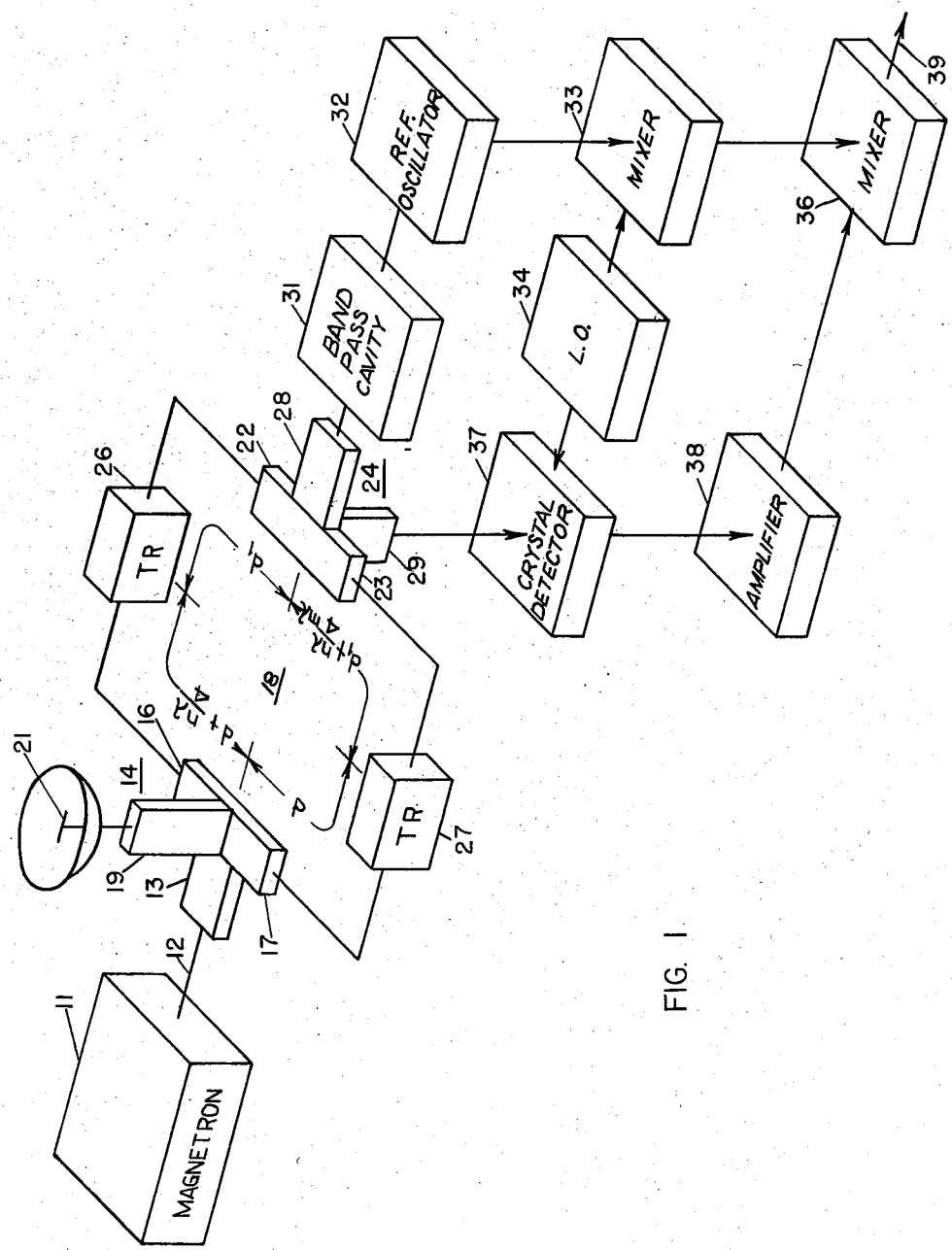
Figure 1 is a schematic diagram of one form of the invention in which various circuit elements are generally represented by blocks and wave guide sections as single lines for the purpose of simplification.

Referring now to Fig. 1 a magnetron or other high frequency pulse generator indicated by block 11 is connected through a suitable section of wave guide 12 to the parallel arm 13 of a microwave hybrid circuit here illustrated as a rectangular magic tee 14. The two adjacent arms 16 and 17 of the magic tee 14 are coupled to a wave guide loop indicated generally by the reference character 18 and the series arm 19 is coupled to a transmitting and receiving antenna 21.

The opposite side of the wave guide loop 18 is coupled to the adjacent arms 22 and 23 of a second microwave hybrid circuit illustrated in Fig. 1 as a rectangular magic tee 24. The loop also includes TR tubes 26 and 27 in its respective branches and the loop is so proportioned that the distance from magic tee 14 to magic tee 24 in one branch differs from the distance in the other branch by an integral number of wavelengths, where as here used integral number also includes zero, i. e., the distances through the two branches may be the same as well as different by any integral number of wavelengths. At the same time the TR tubes 26 and 27 are so located in the branches of the wave guide loop that the distance from magic tee 14 to TR tube 26 exceeds the distance $d$ from magic tee 14 to TR tube 27 by an odd number of quarter wavelengths, that is, the distance from magic tee 14 to TR tube 26 is equal to $$d + \frac{n\lambda}{4}$$

where $d$ is the distance from magic tee 14 to TR tube 27; $n$ is any odd integer, and $\lambda$ is the wavelength in the wave guide of the signal generated by the magnetron 11. Similarly the distance from TR tube 27 to magic tee 24 differs by the same odd number of quarter wavelengths plus or minus an integral number of wavelengths. That is to say, the distance from TR tube 26 to magic tee 24 is equal to $d_1$ which may be the same or differ from the distance $d$ by any amount, and the distance from TR tube 27 to magic tee 24 is equal to $$d_1 + \frac{n\lambda}{4} \pm m\lambda$$

where $n$ and $\lambda$ have the same values as given above and $m$ is an integer. Integer as used herein is defined as including zero. In other words, the lengths of the branches from magic tee to magic tee are the same or different by any integral number of wavelengths and the distances from either magic tee to the two TR tubes differ by an odd number of quarter wavelengths. Where it is desired that a broad band be transmitted $n$ should be made small, for example, $n$ may be made equal to 1 while $m$ is made equal to zero although of course it is readily apparent that the invention is not restricted to such dimensions.

The parallel arm 28 of the magic tee 24 is connected through a high Q band-pass cavity 31 to the reference oscillator 32 which generates a continuous wave signal of substantially the same frequency as the pulse signal generated by the magnetron 11.

A portion of the signal generated by the reference oscillator 32 is transmitted to a mixer 33 where it is mixed with a signal generated by a local oscillator 34 and a beat frequency obtained. The local oscillator is operated at a frequency which departs from that of the reference oscillator 32 and magnetron 11 by a fixed amount, for example, 30 megacycles, and hence the beat signal derived from the mixer 33 and in turn transmitted to a second mixer 36 has a frequency equal to the difference in frequency between the signal generated by the local oscillator 34 and reference oscillator 32, that is to say, under the example given by way of illustration only, a frequnecy of 30 megacycles.

A second portion of the signal generated by the local oscillator 34 is transmitted to a crystal detector 37 where it is combined with the received signal derived from the series arm 29 of magic tee 24 producing a difference beat frequency signal which is amplified by amplifier 38 and thence transmitted to mixer 36 where it is combined with the signal derived from the mixer 33 to produce a final difference beat frequency signal which is representative of the Doppler shift in transmitted and received signals.

The received signal which is the echo of the transmitted signal differs in frequency from the transmitted signal by reason of the Doppler effect if the object from which the signal is transmitted and on which the echo signal is received is moving relative to the object which reflects the transmitted signal and this difference in frequency is a measure of the relative speed of the two objects.

Assuming, for example, that the system of Fig. 1 is carried on an airplane and the pulse signals generated by the magnetron are transmitted to the earth, reflected thereby and the reflected or echo signals received by the system, then by determining the difference in frequency between the transmitted and received signals the true speed of the airplane with respect to the earth's surface may be obtained in the following manner:

When the magnetron 11 is pulsed signal energy enters the magic tee 14 by way of the parallel arm 13 and divides equally between the two adjacent arms 16 and 17 going out of these arms in phase. Since this signal energy is of considerable power it fires the two TR tubes 26 and 27 short circuiting the wave guide loop 18 at these points. This signal is therefore reflected at these points and returns to the magic tee 14.

Because the path from the magic tee 14 to TR tube 26 is a quarter of a wavelength, or an odd multiple thereof, longer than the path from the magic tee 14 to TR tube 27 the signal in traversing the two paths from the magic tee 14 to TR tubes 26 and 27 and back to the magic tee 14 will travel over paths one of which is a half wavelength or odd multiple thereof longer than the other and hence arrive at the adjacent arms of the magic tee 14 out of phase. This is the condition for energy transfer in the magic tee to the series arm 19 and since this arm is coupled to the antenna 21 essentially all of the power generated by the magnetron is radiated.

What power manages to leak through the fired TR tubes 26 and 27 will arrive at the magic tee 24 in phase, since the path lengths in both branches of the loop 18 from the magic tee 14 to the magic tee 24 are the same or differ by a number of wavelengths and hence would be transmitted through the parallel arm 28 to the reference oscillator 32 tending to affect its stability of operation. However, in the instant invention, the high Q band-pass cavity 31 is introduced into the circuit leading to the reference oscillator and since it is sharply selective it rejects all but a small part of the relatively wide band of leakage pulse energy. The reference oscillator 32 is thereby effectively isolated from the energy generated by the magnetron through the medium of the TR tubes 26 and 27 and the band-pass cavity 31 so that stability of operation is obtained.

After a pulse signal generated by the magnetron 11 has been transmitted in the manner just described, the energy in the system is reduced and the TR tubes 26 and 27 cease to fire. The system is now ready to receive echo signals. On the reception of an echo signal by antenna 21 the signal energy is transmitted to the magic tee 14 through the series arm 19 and since it has been transmitted through the series arm it divides in the adjacent arms 16 and 17 out of phase. The level of the received power being low the TR tubes 26 and 27 are not fired and the received energy is divided and transmitted through the TR tubes to the magic tee 24 arriving there out of phase because of the equal path lengths from magic tee 14 to magic tee 24.

Since the received signal arrives at the magic tee 24 through the two paths of the loop 18 out of phase, the conditions are such that the out of phase divided signal energy is added in the series arm 29 and transmitted to the crystal detector 37. Here the signal is combined with signal generated by the local oscillator 34 which in the example heretofore given, differs from the frequency of the signal generated by the reference oscillator 32 and the frequency of the signal generated by the magnetron 11 by 30 megacycles. The beat signal obtained by combining the received signal with the signal generated by the local oscillator will therefore depart from the value of 30 megacycles by the amount of Doppler shift the signal has undergone by being transmitted, reflected and again received. That is to say, considering $f$ as the frequency of the signal generated by the magnetron 11 and the reference oscillator 32 and $\Delta f$ as the amount of Doppler shift in frequency undergone by transmission, reflection and subsequent reception the frequency of the received signal will be $f+\Delta f$ assuming approaching conditions. At the same time under the assumption made previously the signal generated by the local oscillator 34 is equal to $f-30$ mc. Subtracting these frequencies through action of the crystal detector 37 gives the result:

$$f+\Delta f-f+30 \text{ mc.}=30 \text{ mc.}+\Delta f$$

The signal of this frequency is amplified by the amplifier 38 and transmitted to the mixer 36 where it is combined with a beat signal obtained by mixing the signal generated by the local oscillator 34 and reference oscillator 32 in mixer 33. Since the signal generated by the reference oscillator 32 has a frequency of the value $f$ and the signal generated by the local oscillator 34 has a frequency of the value $f-30$ mc., the difference or beat frequency signal obtained from combining these signals in the mixer 33 is $$f-f+30 \text{ mc.}=30 \text{ mc.}$$

Combining this stable 30 megacycle signal obtained from the output of mixer 33 with the signal output of amplifier 38 heretofore determined to have a frequency of the value 30 mc.$+\Delta f$ produces the result:

$$30 \text{ mc.}+\Delta f-30 \text{ mc.}=\Delta f$$

Hence the output of the mixer 36 which may be derived from the line 39 represents a signal of the frequency of the Doppler shift in frequency and this frequency may be measured in any well-known manner to produce an indication of speed.

As heretofore stated, however, the output of mixer 36 will yield useful information only providing that the oscillations of the pulse signals generated and transmitted by the magnetron 11 have the same relative phase as the signals used for comparison purposes, namely, those generated by the reference oscillator 32.

To provide such a proper phase relation and to prevent the oscillations of the pulse signals of the magnetron from being random in phase as they would be if not otherwise controlled, is a function of the reference oscillator 32.

Signals generated by the reference oscillator 32 pass through the high Q band-pass cavity 31 tuned to the frequency of the signals generated by reference oscillator 32. These signals are transmitted to the magic tee 24 through the parallel arm 28 and therefore are divided in phase in the two adjacent arms 26 and 27. As long as these signals are of a power level low enough so that TR tubes 26 and 27 are not fired, the energy generated by the reference oscillator is transmitted equally through the two branches of the loop 18 and since these branches are of equal length the energy arrives at magic tee 14 through adjacent arms 16 and 17 in equal phase. This is the necessary criterion for coupling energy into the parallel arm 13 of the magic tee 14 and hence the energy transmitted by the two paths of the loop is added and coupled to the magnetron 11. Since as stated the energies arriving at magic tee 14 through adjacent arms 16 and 17 are in phase, they cannot enter series arm 14, hence the reference oscillations cannot excite antenna 21 directly.

Energy generated by the continuous wave reference oscillator is therefore fed to the magnetron at all times that sufficient power has not been built up by the magnetron to fire the TR tubes 26 and 27. The critical period of course, is during the build-up period of the magnetron when the energy fed thereto by the reference oscillator forces it to assume the same phase relation as the unvarying phase relation of the continuous wave signals generated by the reference oscillator 32.

The level of power necessary properly to phase the magnetron 11 which power is derived from the reference oscillator 32 must not be sufficient to break down the TR tubes 26 and 27 since should they fire reference signal cannot be transmitted to the magnetron 11. This power level can be increased, however, by using a number of TR tubes in parallel so that this condition of power level is not critical.

A more critical condition, and one which places an upper limitation on the amount of power that may be derived from the reference oscillator 32 to phase the magnetron 11, is that this power must not be sufficient to burn out the crystal detector 37, since during the instant that the TR tubes 26 and 27 are fired by the transmitted magnetron pulse all of the power generated by the reference oscillator 32 is transmitted to the crystal detector 37 in the following manner:

When the magnetron pulse is transmitted TR tubes 26 and 27 are fired as described heretofore. At this instant the two paths through the wave guide loop 18 are shorted and any energy transmitted thereto by the reference oscillator 32 is reflected thereby back to the magic tee 24. Since this energy was divided in the adjacent arms 22 and 23 in phase and since in traveling to and being reflected from the TR tubes 26 and 27, the energy in one branch travels a distance of half a wavelength $\pm$ an integral number of wavelengths longer than that in the other branch, the energy so transmitted and returned arrives back to the magic tee 24 out of phase. This is the criterion for coupling energy into the series arm 29 which in turn transmits signal directly to the crystal detector 37.

Figure 2:
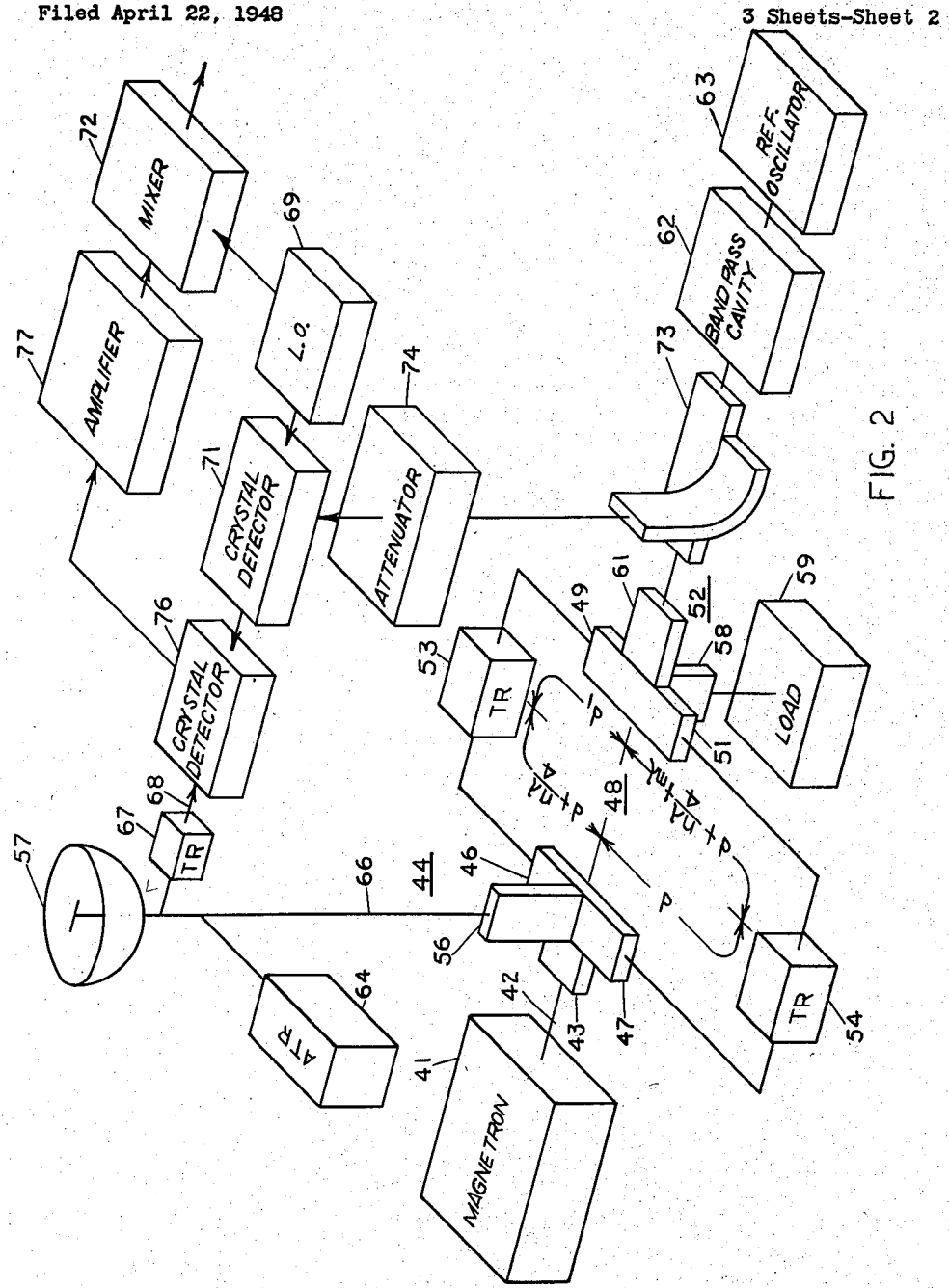
Figure 2 is a schematic diagram of a modified form of the invention, likewise using block and line representations.

Where, therefore, the energy level requirements for properly phasing the magnetron are such as to preclude the use of the system of Fig. 1 because of consequent burning out of the crystal detector, the present invention contemplates use of a system as disclosed in Fig. 2 which although utilizing a number of additional circuit components avoids impressing too much of the reference oscillator power on the crystal detector at any time.

Referring now to Fig. 2 oscillatory pulse signals generated by a magnetron 41 are transmitted through a wave guide section 42 to the parallel arm 43 of a magic tee 44. The magic tee 44 is coupled to a wave guide loop 48 through its adjacent arms 46 and 47 and loop 48 is similar in construction and operation to loop 18 of Fig. 1, having two paths of equal distance connecting the adjacent arms 46 and 47 of magic tee 44 to adjacent arms 49 and 51 of magic tee 52. As in the case of the wave guide loop of Fig. 1 the loop 48 is so proportioned and the TR tubes 53 and 54 are inserted in such positions that the lengths of the branches from magic tee to magic tee are the same or different by an integral number of wavelengths and the distances from either magic tee to the two TR tubes differ by an odd number of quarter wavelengths.

The series arm 56 of magic tee 44 is connected to an antenna 57 while the series arm 58 of magic tee 52 is connected to and terminates in a load 59. The parallel arm 61 of magic tee 52 is connected through a high Q band-pass cavity 62 to a reference oscillator 63 which performs the same functions of phasing the magnetron as does the reference oscillator of the system of Fig. 1.

In order that the pulse signals may be transmitted and received on the single antenna 57 ATR and TR tubes are connected to the antenna circuit as in a conventional radar system. An ATR tube 64 is connected in series with the antenna branch 66 and is located a half wavelength therefrom while a TR tube is located in the wave guide section leading to the receiving circuit and is connected in parallel with the antenna branch 66 a quarter wavelength therefrom.

When a high power pulse is transmitted by the magnetron 41 both the ATR tube 64 and the TR tube 67 are caused to fire. The firing of the ATR tube permits the power generated by the magnetron to flow outward toward the antenna 57. At the same time the firing of the TR tube 67 places a short circuit across the line to the receiving circuit and since this short circuit is a quarter wavelength from the antenna branch 66, the impedance put in parallel with the antenna branch is very high and does not affect the wave traveling toward the antenna.

At the end of the transmitted pulse the discharges across the ATR tube 64 and TR tube 67 go out and the system is now ready to receive echo signals. The echo signals received have an energy level greatly below that necessary to fire the ATR and TR tubes and hence the impedance of the branch 66 looking toward the magnetron is infinite as there is an open circuit half a wavelength away. On the other hand looking toward the receiving circuit there is a matched line and all of the power flows through branch 68 to the receiving circuit.

The receiving circuit comprises a local oscillator 69 which generates a continuous signal of some suitable fixed frequency, as for example, 30 megacycles. Signal from this oscillator is fed to both a crystal detector 71 and a mixer 72. At the crystal detector 71 the signal generated by the local oscillator 69 is added to a small portion of the signal generated by the reference oscillator 63 obtained through a directional coupler 73.

If the portion of the reference oscillator power obtained through the directional coupler 73 and impressed on the crystal detector 71 is such as to be likely to burn out the crystal, an attenuator 74 may be inserted in the line between the directional coupler 73 and crystal detector 71 to reduced the power impressed thereon to a suitable safe level.

Considering the frequency of the signal generated by the reference oscillator 63 as represented by the symbol $f$, which incidently is also the frequency of the transmitted signal, the addition of this signal to the signal generated by the local oscillator 69 in the crystal detector 71 produces an output of the value $f+30$ mc.

This signal output is impressed on a crystal detector 76 where it is combined with the received signal transmitted through line 68 and a difference frequency signal is obtained which in turn is impressed on an amplifier 77. The received signal differs from the frequency of the transmitted signal by an amount equal to the Doppler shift and may be represented by the value, $f+\Delta f$; where $f$ is the frequency of the transmitted signal and $\Delta f$ the Doppler shift frequency.

When this signal is combined with the output of the crystal detector 71 and the difference frequency or beat note obtained through action of the crystal detector 76 there is obtained a signal having the value:

$$f+30 \text{ mc.}-f-\Delta f=30 \text{ mc.}-\Delta f$$

that is a signal in the neighborhood of 30 mc. but departing therefrom by an amount equal to the Doppler shift.

This signal is amplified by the amplifier 77 and impressed on the input of the mixer 72 on which is also impressed a portion of the signal generated by the local oscillator 69. These two signals are combined in the mixer 72 and a second beat signal obtained which since the signals impressed thereon have values of 30 mc. and 30 mc.$-\Delta f$ will be equal to the difference thereof or, $\Delta f$ the frequency to be measured to obtain an indication of true speed.

It will be seen, therefore, that the system of Fig. 2 operates in a manner generally similar to the system of Fig. 1 to produce the same results except that in the system of Fig. 2 the crystal detectors of the receiving system are at all times isolated from all but a portion of the reference oscillator signal energy and hence higher levels of power may be used without consequent damage to these crystal detectors.

When as in the system of Fig. 1, the TR tubes 53 and 54 are fired by generation of pulse signals by the magnetron 41 and hence the signal energy developed by the reference oscillator is reflected back from these points in the loop 48 through the series arm 58 of the magic tee 52, this energy is coupled to and dissipated in the load 59 and is incapable of damaging the more delicate receiver circuits.

Aside from the rectangular magic tees as disclosed in connection with Figs. 1 and 2 other forms of microwave hybrid circuits may be used with equal effect. One other such microwave hybrid circuit is disclosed in Figs. 3, 4 and 5 which may be substituted for any one or more of the rectangular magic tees 14, 24, 44 and 52 of Figs. 1 and 2, producing the same results.

Figure 3:
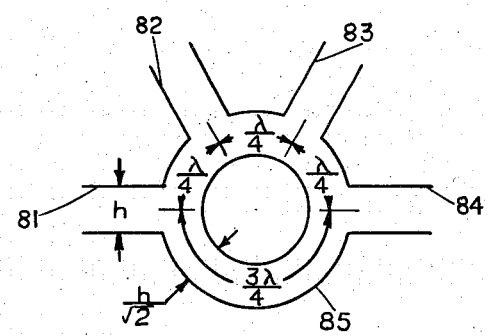
Figures 3, 4 and 5 are diagrammatic representations of a modified form of hybrid junction which may be used in the circuits of Figs. 1 and 2.

As indicated in Fig. 3 this hybrid junction takes the form of a circular wave guide section 85 whose mean circumference is $$\frac{3\lambda}{2}$$

having four arms 81, 82, 83 and 84 connected thereto. These arms are so positioned that the distances between arms 81 and 82, 82 and 83, and 83 and 84 are equal to $$\frac{\lambda}{4}$$

while the distance between arms 81 and 84 is $$\frac{3\lambda}{4}$$

Fig. 3 is shown in plan view and the distance $h$ is the narrow dimension or height of a rectangular wave guide, the height of the ring section being $$\frac{1}{\sqrt{2}}$$

times this distance or $$\frac{h}{\sqrt{2}}$$

In elevation the width of the ring section is equal to the width of the rectangular wave guide section, that is, their wide dimensions. The impedance of the ring section is therefore roughly $$\frac{1}{\sqrt{2}}$$

that of the rectangular sections.

Figure 4:
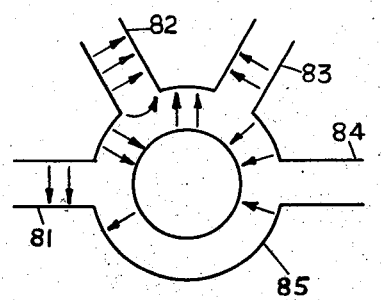

Considering now the operation of this device and referring particularly to Fig. 4, if power is introduced into arm 82 in the $TE_{0,1}$ mode, that is, transverse electrical as indicated by the arrows, the amount of power introduced into the central ring section will split in an out of phase relation and since the distances from arm 82 to the arms 81 and 83 are equal, the power introduced into these arms will be in opposite phase relation. Equal amounts of power will leak by arms 81 and 73, continuing around the ring section 85 towards arm 84. The power that leaks by arm 83 going in a clockwise direction will travel a half wavelength whereas the power that leaks by arm 81 going in a counterclockwise direction will travel a full wavelength, and since one path is half a wavelength longer than the other the two waves will arrive at the entrance to arm 84 in phase with each other; such a field cannot excite arm 84 so that no power is transmitted through this arm. It will be appreciated that the converse is also true, that is, if power is introduced into arms 81 and 83 in opposite phase this power will excite arm 82 but not arm 84.

Figure 5:
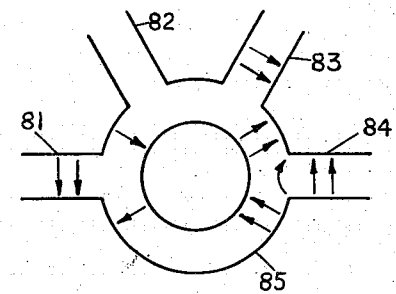

Consider now the situation that obtains when power is introduced into the arm 84 having particular reference to Fig. 5. The power introduced into arm 84 will divide in an out of phase relation as indicated by the arrows. That which goes around the ring section in a counterclockwise direction will reach the arm 83 in the distance of a quarter of a wavelength while that which proceeds in a clockwise direction must travel a half wavelength further or three quarters of a wavelength hence the power which divided in an out of phase relation will be introduced into the arms 81 and 83 by waves which are in phase with each other. On the other hand, such power as leaks by arms 81 and 83 will arrive at arm 82 in an in phase relation and since the power is the same in either direction around the ring section the arm 82 is not excited. Here again the converse is also true, that is, power introduced into arms 81 and 83 in phase will excite the arm 84 but not the arm 82.

It will be seen therefore, that this instrumentality has the same operating characteristics as the rectangular magic tees described in connection with Figs. 1 and 2 and considering arms 81 and 83 as what have been termed the adjacent arms, arm 82 as what has been termed the series arm and arm 84 as what has been termed the parallel arm substitution may be made without further consideration.

Microwave hybrid circuit as used herein is defined as those wave guide junctions having four arms in which when energy is introduced in the first arm it is equally divided between the second and third arms but no energy is transmitted through the fourth arm whereas when energy is introduced in the fourth arm it is again equally divided between the second and third arms but no energy is transmitted through the first arm.

Adjacent arms as used herein are defined as the second and third arms between which the energy is equally divided when introduced into either of the remaining arms.

Series arm as used herein is defined as the arm which when energy is introduced therein results in a division of energy in the adjacent arms in opposed phase relationship.

Parallel arm as used herein is defined as the arm which when energy is introduced therein results in a division of energy in the adjacent arms in in phase relationship.

What is claimed is:

1. In a system of the class described, a generator of high frequency pulse signals, a generator of continuous wave oscillations of substantially the same frequency as the oscillations of said high frequency pulse signals, a single antenna for transmitting said high frequency pulse signals and for receiving echoes thereof, means for impressing said continuous wave oscillations on said generator of high frequency pulse signals during the periods just prior to the generation of said pulse signals and for preventing radiation of said continuous wave oscillations by said antenna, and means for substantially prohibiting the imposition of said high frequency pulse signals on said generator of continuous wave oscillations and for transmitting substantially the entire energy of said pulse signals to said antenna for radiation thereby.

2. A system in accordance with claim 1 in which said means for impressing said continuous wave oscillations on said generator of high frequency pulse signals and for preventing radiation of said continuous wave oscillations by said antenna comprises; a wave guide loop having two branches the length of one of which is equal to the length of the other plus an integral number of wavelengths, first and second microwave hybrid circuits each having a pair of adjacent arms, a shunt arm and a series arm located at the opposite junctures of said branches and connecting said branches through their adjacent arms to form said loop, a connection between said generator of continuous wave oscillations and one of the remaining arms of said first microwave hybrid circuit, a connection between said generator of high frequency pulse signals and the similar arm of said second microwave hybrid circuit, and a connection between the remaining arm of said second microwave hybrid circuit and said antenna.

3. A system in accordance with claim 2 in which said means for substantially prohibiting the imposition of said high frequency pulse signals on said generator of continuous wave oscillations and for transmitting substantially the entire energy of said pulse signals to said antenna comprises; first and second TR tubes connected in the respective branches of said wave guide loop at such relative positions therein that the distance from said second microwave hybrid circuit to said first TR tube exceeds the distance from said second microwave hybrid circuit to said second TR tube by an odd number of quarter wavelengths of said high frequency pulse signals in said wave guide.

4. A system in accordance with claim 3 in which said means for substantially prohibiting the imposition of said high frequency pulse signals on said generator of continuous wave oscillations additionally includes a sharply resonant band-pass cavity connected between said first microwave hybrid circuit and said generator of continuous wave oscillations.

5. In a system of the class described, a generator of high frequency pulse signals, a generator of continuous wave oscillations of substantially the same frequency as the oscillations of said high frequency pulse signals, a single antenna for transmitting said high frequency pulse signals and for receiving echoes thereof, means for impressing said continuous wave oscillations on said generator of high frequency pulse signals during the periods just prior to the generation of said pulse signals and preventing radiation of said continuous wave oscillations by said antenna, means for substantially prohibiting the imposition of said high frequency pulse signals on said generator of continuous wave oscillations and for transmitting substantially the entire energy of said pulse signals to said antenna for radiation thereby, a receiving circuit, means for preventing the direct imposition of said high frequency pulse signals on said receiving circuit and means in said receiving circuit utilizing a portion of the signal energy produced by said generator of continuous wave oscillations for producing a low frequency signal which is substantially equal to the difference in frequency between the transmitted high frequency pulses and the received echoes thereof.

6. A system in accordance with claim 5 in which said receiving circuit includes a local oscillator.

7. A system in accordance with claim 6 in which said means for impressing said continuous wave oscillations on said generator of high frequency pulse signals and for preventing radiation of said continuous wave oscillations by said antenna comprises; a wave guide loop having two branches, the length of one of which is equal to the length of the other plus an integral number of wavelengths, first and second microwave hybrid circuits each having a pair of adjacent arms, a shunt arm and a series arm located at the opposite junctures of said branches and connecting said branches through their adjacent arms to form said loop, a connection between said generator of continuous wave oscillations and one of the remaining arms of said first microwave hybrid circuit, a connection between said generator of high frequency pulse signals and the similar arm of said second microwave hybrid circuit, and a connection between the remaining arm of said second microwave hybrid circuit and said antenna.

8. A system in accordance with claim 7 in which said means for substantially prohibiting the imposition of said high frequency pulse signals on said generator of continuous wave oscillations and for transmitting substantially the entire energy of said pulse signals to said antenna comprises; first and second TR tubes connected in the respective branches of said wave guide loop at such relative positions therein that the distance from said second microwave hybrid circuit to said first TR tube exceeds the distance from said second microwave hybrid circuit to said second TR tube by an odd number of quarter wavelengths of said high frequency pulse signals in said wave guide.

9. In a system of the class described, a generator of high frequency pulse signals, a generator of continuous wave oscillations of substantially the same frequency as the oscillations of said high frequency pulse signals, a single antenna for transmitting said high frequency pulse signals and for receiving echoes thereof, means for impressing said continuous wave oscillaitons on said generator of high frequency pulse signals during the periods just prior to the generation of said pulse signals and preventing radiation of said continuous wave oscillations by said antenna, means for substantially prohibiting the imposition of said high frequency pulse signals on said generator of continuous wave oscillations and for transmitting substantially the entire energy of said pulse signals to said antenna for radiation thereby, a receiving circuit connected to said antenna, means for preventing the direct imposition of said high frequency pulse signals on said receiving circuit but impressing echo signals received by said antenna on said receiving circuit, said receiving circuit comprising a local oscillator generating signals of an intermediate frequency, a first detector connected to receive the intermediate frequency signals and a portion of the signal energy produced by said generator of continuous wave oscillations and operative to produce an additive signal having a frequency which is the sum of the frequency of said intermediate frequency signals and the frequency of said continuous wave signals, a second detector, circuits impressing said additive signal and said echo signal on said second detector, said second detector producing an output signal whose frequency is the difference of the frequencies of the signals impressed thereon, mixer means for producing a difference beat frequency and circuit means for impressing the output of said second detector and said local oscillator on said mixer means whereby a low frequency signal is obtained whose frequency is equal to the difference in frequency between the transmitted high frequency pulses and the received echoes thereof.

10. A system in accordance with claim 9 in which the portion of the signal energy produced by said generator of continuous oscillations is impressed on said final detector through a circuit which includes a directional coupler.

11. A system in accordance with claim 10 in which said means for impressing said continuous wave oscillations on said generator of high frequency pulse signals and for preventing radiation of said continuous wave oscillations by said antenna comprises; a wave guide loop having two branches, the length of one of which is equal to the other plus an integral number of wavelengths, first and second microwave hybrid circuits each having a pair of adjacent arms, a shunt arm and a series arm located at the opposite junctures of said branches and connecting said branches through their adjacent arms to form said loop, a connection between said generator of continuous wave oscillations and one of the remaining arms of said first microwave hybrid circuit, a connection between said generator of high frequency pulse signals and the similar arm of said second microwave hybrid circuit, and a connection between the remaining arm of said second microwave hybrid circuit and said antenna.

12. A system in accordance with claim 11 in which said means for substantially prohibiting the imposition of said high frequency pulse signals on said generator of continuous wave oscillations and for transmitting substantially the entire energy of said pulse signals to said antenna comprises; first and second TR tubes connected in the respective branches of said wave guide loop at such relative positions therein that the distance from said second microwave hybrid circuit to said first TR tube exceeds the distance from said second microwave hybrid circuit to said second TR tube by an odd number of quarter wavelengths of said high frequency pulse signals.

References Cited in the file of this patent

UNITED STATES PATENTS

| | | |
|---|---|---|
| 2,392,380 | Varian | Jan. 8, 1946 |
| 2,415,095 | Varian | Feb. 4, 1947 |
| 2,416,367 | Young | Feb. 25, 1947 |
| 2,418,121 | Hoffman | Apr. 1, 1947 |
| 2,424,156 | Espley | July 15, 1947 |
| 2,498,495 | Jensen | Feb. 21, 1950 |